Jan. 9, 1923.
J. HELLER.
RAZOR BLADE HOLDER.
FILED JAN. 3, 1922.
1,441,346
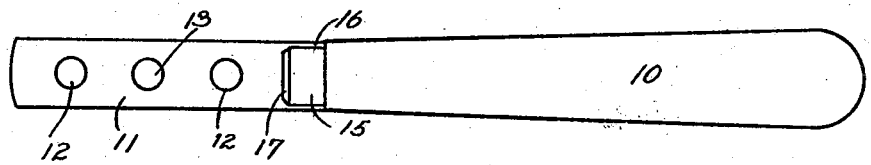
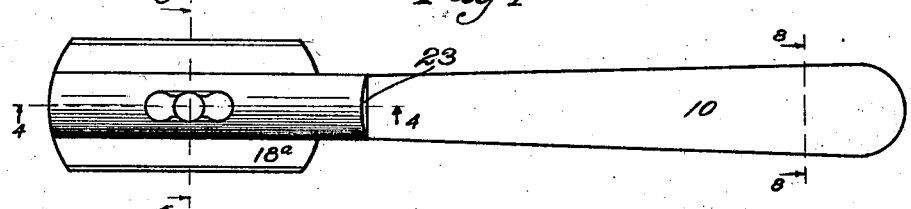
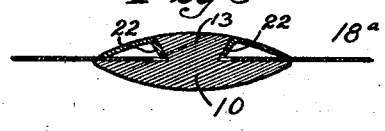
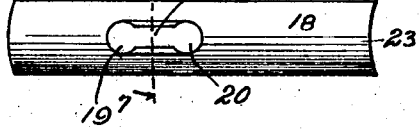
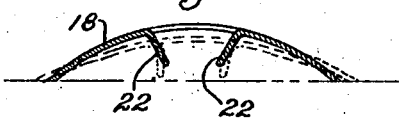
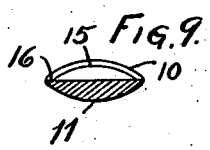
Inventor
Joseph Heller
By Bair & Freeman
attys
Witness Patented Jan. 9, 1923.

1,441,346

UNITED STATES PATENT OFFICE.

JOSEPH HELLER, OF DES MOINES, IOWA.

RAZOR-BLADE HOLDER.

Application filed January 3, 1922. Serial No. 526,463.

*To all whom it may concern:*

Be it known that I, JOSEPH HELLER, a citizen of the United States, and a resident of Des Moines, in the county of Polk and State of Iowa, have invented a certain new and useful Razor-Blade Holder, of which the following is a specification.

The object of my invention is to provide a razor blade holder especially adapted for holding razor blades in position where they may readily be sharpened by the use of the ordinary leather strap, the parts being of simple, durable and comparatively inexpensive construction.

More particularly, my invention relates to a blade holder, wherein the blade may be properly held in position for purposes of being sharpened, the means for maintaining the blade being so arranged that it may be readily and easily slipped into position or out of position, as desired.

Still another object is to provide novel means on the handle member and holder member of my device, whereby they may coact together for maintaining a blade in position therebetween.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top plan view of my improved blade holder with a blade shown therein.

Figure 2 is a top plan view of the same with the blade removed.

Figure 3 is a side elevation of Figure 2.

Figure 4 is a central, sectional view taken on the line 4—4 of Figure 1.

Figure 5 is a sectional view taken on the line 5—5 of Figure 1.

Figure 6 is a top, plan view of the holder member.

Figure 7 is an enlarged, sectional view taken on the line 7—7 of Figure 6, one of the positions of the holder member being shown in dotted lines.

Figure 8 is a sectional view taken on the line 8—8 of Figure 1, showing the shape of the handle element; and Figure 9 is a sectional view taken on line 9—9 of Fig. 3.

In the accompanying drawings, I have used the reference numeral 10 to indicate generally a handle element, which is curved from side to side, as shown clearly in Figure 8 of the drawings.

The handle element 10 is provided with a flat surfaced extension 11. The extension 11 has its under side curved from side to side. Arranged on the upper surface of the extension 11 are the circular lugs 12. Midway between the lugs 12, I provide a stud 13 having its opposite sides tapered downwardly and inwardly, as at 14. The purpose of tapering the sides 14 will hereafter more fully be set forth.

Adjacent to the handle element 10 and on the extension 11, I provide a raised portion or projection 15, which is curved from side to side and is arranged so that a shoulder 16 is formed between the ends of the handle element 10.

The free end of the projection 15 is beveled as at 17.

The razor blade referred to by the reference numeral 18$^a$ is of the type that is provided with three openings, which openings are designed to receive the lugs 12 and the stud 13. The placing of the blade 18$^a$ over the lugs and stud, positions the blade on the extension 11. One edge of the blade is flush with the outer edge of the extension 11 and the other edge of the blade rests against the projection 15.

In order to hold the blade in position, while it is being used, I provide a holder member 18 formed of spring material. The holder member 18 is curved from side to side, as clearly shown in Figure 7 of the drawings.

The holder member 18 is provided with a pair of openings 19 and 20 connected together by a slot 21. It may be properly said that the openings 19 and 20 and the slot 21 form one slot or opening.

The side edges of the opening of the slot 21 are inclined downwardly and inwardly, so as to form the flanges 22. The openings 19 and 20 are of substantially the same diameter as the stud 13. The outer end of the holder member 18 is arranged to be flush with the outer end of the blade.

On the opposite end of the holder member, I provide a notch 23, which serves as a finger engaging notch when the holder member is slid off of the extension 11. The inclined flanges 22 are designed to coact and rest against the tapered sides 14 of the studs 13, which securely hold the holder member 18 in position.

The holder member 18 is slid over the projection 15 until it strikes against the shoulder 16 on the handle element 10. The holder element striking against the shoulder 16 will leave the notch 23, so that it may be engaged by the thumb, while the remainder of the hand engages the handle element for shifting or sliding the holder member to open position.

In the placing of the holder member in position, the opening 20 is placed over the stud 13. The entire holder member is then slid longitudinally towards the handle element. This brings the flanges 22 in engagement with the tapered sides 14 of the stud 13. The lower edges of the flanges 22 terminate short of the plane in which the side edges of the holder member are in, so that when the holder member is being slid onto or off of the stud 13, pressure applied upon the holder member adjacent to the slot 21 will cause the flanges to be moved slightly outwardly, thereby eliminating their pressure against the stud 13, thus permitting the easy sliding of the parts into or out of operative position.

When pressure is applied upon the holder member adjacent to the slot 21, the parts will move to the position shown in dotted lines in Figure 7 of the drawings. The stud 13 and the extension 15 form the two members against which the holder member will rest when in operative position, thereby eliminating any possible oscillation or undesired movement of the holder member 18.

It will be seen that the razor blade when held in my device may be easily sharpened in the same manner, as is the ordinary straight-edged razor. The holder may also be used for holding a razor blade when it is used as a ripping knife by seamstresses.

The holding of the blade by my holder member permits the use of the same with safety for a great many different uses.

Some changes may be made in the construction and arrangement of the various parts of my device, without departing from the essential features and purposes of my invention, and it is my intention to cover by my claims, any modified forms of structure or use of mechanical equivalents, which may be reasonably included within their scope.

I claim as my invention:

1. A blade holder including a handle element having an extension formed thereon, a stud on said extension, said stud having opposite sides tapered downwardly and inwardly, a holder member adapted to be received over said extension and to be secured thereto, said holder member having a slot formed therein, a portion of the opposite side edges of said slot having flanges inclined downwardly and inwardly, the inclined sides of said slot being designed to be slid on to said stud, to coact therewith for holding the holder member on said extension, the flanges on said holder member being capable of being sprung away from said stud for permitting the easy removal of the holder member.

2. A blade holder including a handle element having an extension formed thereon, a stud on said extension, said stud having opposite sides tapered downwardly and inwardly, a holder member, said holder member being curved from side to side and formed of resilient material and adapted to be received over said extensions and to be secured thereto, said holder member having a slot formed therein, a portion of the opposite side edges of said slot having flanges inclined downwardly and inwardly, the inclined sides of said slot being designed to be slid on to said stud, to coact therewith for holding the holder member on said extension, said flanges being capable of being sprung away from said stud for permitting the easy removal of the holder member.

3. A blade holder including a handle element having a flat surface extension formed thereon on one end thereof, a stud on said extension, said stud having opposite sides tapered downwardly and inwardly, means on said extension for positioning a blade thereon and a resilient holder member for maintaining the blade in proper position, said holder member being curved from side to side and having a slot formed therein, flanges formed on a portion of the side edges of said slot, said flanges being inclined downwardly and inwardly and designed to coact with said stud, the lower edges of said flanges terminating short of the plane in which the side edges of said holder member rest in, said holder member being capable of being slid longitudinally to position where the flanges will coact with said stud and said flanges being capable of being sprung away from said stud for the purposes stated.

4. A blade holder including a handle element having a flat surface extension formed thereon on one end thereof, a stud on said extension, said stud having opposite sides tapered downwardly and inwardly, a projection curved from side to side formed on said extension adjacent to the handle element, means on said extension for positioning a blade thereon and a resilient holder member curved from side to side and having a slot formed therein, lengthwise thereof, flanges formed on the side edges of said slot, said flanges being inclined downwardly and inwardly, the lower edges of said flanges terminating short of the plane in which the side edges of said holder member rest in, said flanges being designed to coact with said stud, a portion of said holder member being designed to fit snugly over said projection, said flanges being capable of being sprung slightly outwardly for releasing their yielding pressure against said stud and permitting the easy removing of the holder member.

5. A blade holder including a handle element having a flat surface extension formed thereon on one end thereof, a stud on said extension, said stud having opposite sides tapered downwardly and inwardly, a projection curved from side to side formed on said extension adjacent to the handle element, means on said extension for positioning a blade thereon and a resilient holder member curved from side to side and having a slot formed therein, lengthwise thereof, said holder member having a finger engaging notch formed in one end thereof, flanges formed on the side edges of said slot, said flanges being inclined downwardly and inwardly, the lower edges of said flanges terminating short of the plane in which the side edges of said holder member rest in, said flanges being designed to coact with said stud, a portion of said holder member being designed to fit snugly over said projection, said flanges being capable of being sprung slightly outwardly for releasing their yielding pressure against said stud and permitting the easy removing of the holder member.

Des Moines, Iowa, December 28, 1921.

JOSEPH HELLER.